United States Patent [19]
Crowley

[11] Patent Number: 6,095,253
[45] Date of Patent: Aug. 1, 2000

[54] LINKAGE FOR INDEPENDENT VERTICAL MOVEMENT OF DIGGER/SHAKER/INVERTER ROOT-CROP HARVESTER APPARATUS

[76] Inventor: Gerald B. Crowley, 8235 S. Country Rd. 33, Dothan, Ala. 36301-9419

[21] Appl. No.: 09/045,616

[22] Filed: Mar. 20, 1998

[51] Int. Cl.$^7$ .................................................. A01D 29/00
[52] U.S. Cl. .......................................... 171/124; 171/101
[58] Field of Search ................................... 172/413, 417, 172/448; 171/101, 61, 1, 102, 127, 124, 14, 27, 41, 53, DIG. 1, 111, 112; 56/16.4, 130, 364

[56] References Cited

U.S. PATENT DOCUMENTS

| | | | |
|---|---|---|---|
| 3,726,345 | 4/1973 | Harrell et al. | 171/101 |
| 3,734,194 | 5/1973 | Whitfield | 171/101 |
| 4,230,188 | 10/1980 | Paulk | 171/101 |
| 4,232,744 | 11/1980 | Thompson | 171/101 |
| 4,257,486 | 3/1981 | Hobbs | 171/101 |
| 4,633,955 | 1/1987 | Gresham | 171/1 |
| 5,111,636 | 5/1992 | Quirin | 56/367 |
| 5,228,522 | 7/1993 | Stufflebeam et al. | 172/417 X |
| 5,359,837 | 11/1994 | Schumacher et al. | 56/10.4 |
| 5,588,494 | 12/1996 | Pickett et al. | 171/124 |

OTHER PUBLICATIONS

"Peanut Digger Shaker Inverters" Kelley Manufacturing Co., Tifton, Georgia, brochure, (undated).

"General Attachments", p. 95–1, 95–2, John Deere 7300 manual for Maxemerge 2 Integral Planters, Manual No. OM–H138093, Issue F8 (undated).

*Primary Examiner*—Robert E. Pezzuto
*Attorney, Agent, or Firm*—Kennedy, Davis & Hodge

[57] ABSTRACT

A multi-row peanut harvester having linkage for independent vertical movement of digger/shaker/inverter assemblies for digging peanut vines from the ground in a field, shaking dirt from the peanut vine roots, and inverting the peanut vines for exposing the peanuts to air. Each linkage comprises two A-frame structures joined at apexes a connecting member. The A-frames connect to a tool bar which attaches to a tractor and to a connector bar which attaches to the DSI assembly. The DSI move vertically independently in response to the DSI's wheels travelling on the ground, independently of the adjacent DSI.

14 Claims, 3 Drawing Sheets

LINKAGE FOR INDEPENDENT VERTICAL MOVEMENT OF DIGGER/SHAKER/INVERTER ROOT-CROP HARVESTER APPARATUS

TECHNICAL FIELD

The present invention relates to root-crop harvesting equipment that digs crop vines from the ground in a field, shakes dirt from the vine roots, and inverts the vines for exposing the crops to the air. More particularly, the present invention relates to a root-crop harvesters having linkage for independent vertical movement of digger/shaker/inverter apparatus.

BACKGROUND OF THE INVENTION

Specialized farming equipment has been developed to facilitate the cultivating of fields, planting of crops in fields, and harvesting of crops from fields. Root-type crops particularly require specialized handling equipment. Root-type crops include peanuts as well as other crops which grow the harvestable product below ground. Harvesting root-crops requires removing the root crop from the ground, removing dirt from the crop product, and typically drying the crop to facilitate separation of the crop product from the plants during final harvesting.

Peanuts are a particular type of root crop for which specialized harvesting apparatus has been developed. Peanuts are a vine-type root crop. The specialized equipment handles the continuous vines which grow on the ridges of the crop rows in the field. Peanut harvesters are generally referred to as digger/shaker/inverters. The peanut harvesting apparatus has a digging assembly from which a pair of angled blades extend. The pair of blades dig into the ridge of the earth on adjacent pairs of rows of peanut vines. The diggers dig underneath the vines to extract the vines and peanut crop from the earth. The peanut harvester also includes a shaker assembly. The shaker assembly has large discs which are rotated and bumped and agitated as the peanut vines move across the shaker after being dug from the ground. The shaker shakes dirt from the roots of the peanut vines. Finally, the peanut harvester has an inverter section for turning the peanut vines over, in order to expose the peanuts to air for drying. The inverter thereafter deposits the inverted vines on the ground.

Typical peanut digger/shaker/inverter assemblies are designed to harvest peanut vines from adjacent pairs of rows of vines. The harvester connects to a tool bar which attaches to a tractor that pulls the digger/shaker/inverter through the field of peanuts.

In order to harvest additional rows during a single pass of the tractor through the field, some manufacturers provide what is known as multi-row peanut harvesters. Multi-row peanut harvesters place two or three digger/shaker/inverter assemblies to a single tool bar. Thus, a three unit DSI harvest six adjacent rows of peanuts at a single pass. Each DSI is driven by a chain drive having sprocket wheels and chains. The sprockets are driven by the drive shaft from the tractor.

While the multi-unit peanut harvesters reduce the time required for harvesting peanuts, these devices have not been entirely satisfactory. The multi-unit DSIs attach to the single elongate tool bar attached to the tractor. Each unit accordingly is at the same vertical height as the adjacent units. However, many peanut fields are not level and there may be a significant difference in elevation even between closely spaced rows of peanuts. In such circumstance, multi-unit DSIs are not feasible on fields that have terraces or uneven surfaces. Plows may be above ground on one side of the set of rows being harvested or in the center, while going excessively deep in some other area. Plows which are too shallow do not harvest the root crop. Plows which are too deep likewise are inefficient and remove excessive soil around the crop which prevents the crop from drying when inverted. Accordingly, multi-unit DSIs work particularly well if soil surface is level. Much of the peanut growing region however does not have level soil surface because of hillsides and terraces which define a undulating surface for the ground.

In these soil regions, the inefficiency of the harvest while using multiple-unit DSIs are so significant, that single unit DSIs are required for harvest. Accordingly, farmers are able to harvest only two rows at a time with a single unit DSI, and three passes through the field along the rows are required to harvest six rows. A multi-unit DSI capable of harvesting non-level adjacent rows efficiently simultaneously would immediately reduce the cost and time required to harvest root-crops such as peanuts.

Accordingly, there is a need in the art for an improved multi-row digger/shaker/inverter apparatus for use in harvesting root-crops. It is to such that the present invention is directed.

SUMMARY OF THE PRESENT INVENTION

The present invention meets a need in the art by providing an improved digger/shaker/inverter for multiple-row harvesting of root crops, such as peanuts, comprising a root-crop harvester having linkage for independent vertical movement of digger/shaker/inverter assemblies for digging root-crop vines from the ground in a field, shaking dirt from the vine roots, and inverting the root-crop vines for exposing the peanuts to air. The present invention has an elongated first tool bar for attachment to a tractor for pulling at least a pair of digger/shaker/inverter assemblies through a root-crop field to be harvested. Each digger/shaker/inverter assembly actually attaches to one of the elongated second tool bars. A linkage connects between the first tool bar and each respective one of the second tool bars. Each linkage comprises a pair of A-frame assemblies. A first one of the pair of A-frame assemblies attaches to the first tool bar and a second one of the pair of A-frame assemblies attaches to the respective one of the second tool bars. A cross-member pivotally connects at distal ends to the pair of A-frames. A digger/shaker/inverter assembly having wheels attaches to each of the respective second tool bars. The digger/shaker/inverter assemblies, being attached to separate second tool bars connected by the linkages to the tool bar on a tractor, move vertically independently of the other such digger/shaker/inverter assemblies as the tractor pulls the digger/shaker/inverter assemblies through the root-crop field to be harvested.

Objects, features, and advantages of the present invention will become apparent from a reading of the following detailed description of the invention and the claims in view of the appended drawings.

DETAILED DESCRIPTION OF THE PREFERRED EMBODIMENTS

Figure 1:
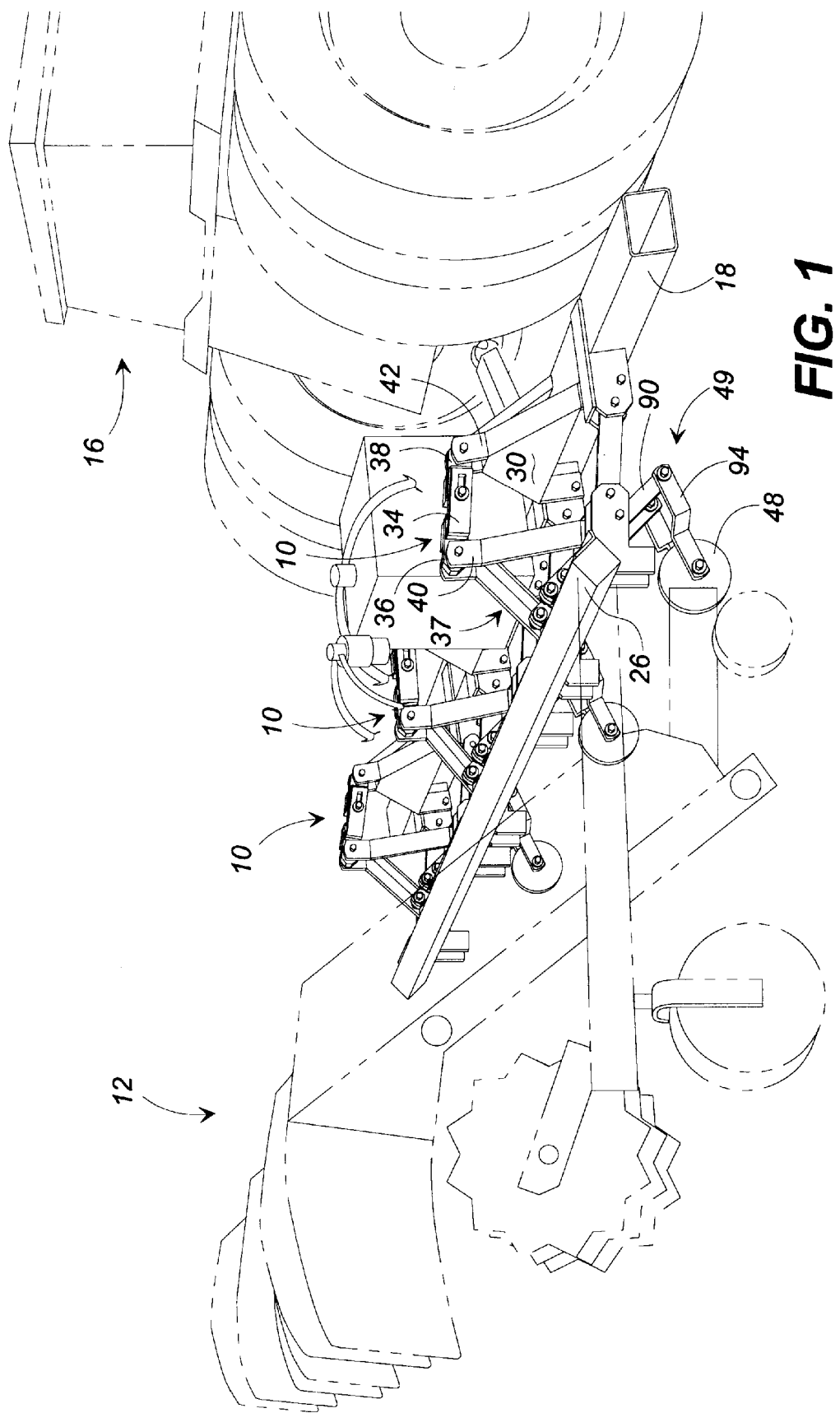
FIG. 1 is a perspective view of a linkage for independent vertical movement of a plurality of digger/shaker/inverter apparatus according to the present invention.

Referring now in more detail to the drawings in which like parts have like identifiers, FIG. 1 is a perspective illustration of a plurality of linkages 10 each providing for independent vertical movement of digger/shaker/inverter apparatus 12 attached thereto (illustrated in phantom), according to the present invention. Each of the linkages 10 connects between a digger/shaker/inverter apparatus 12 and a tractor 16. The tractor 16 includes a toolbar 18 to which planting, cultivating and harvesting tools are attached conventionally.

In the illustrated embodiment, the toolbar 18 connects to three digger/shaker/inverters assemblies 12, which are referred to herein as "IDSI". The DSI 12 are identical units, and the discussion regarding one DSI applies to the other DSI as well. The DSI 12 includes a connector bar 26 for supporting a forward end of the DSI. The linkage 10 connects the toolbar 18 to the connector bar 26. In this way, as the tractor 16 moves through the field, the DSI 12 is pulled through the field for harvesting the root crops, such as peanuts.

The linkage 10 comprises a pair of A-frame assemblies 30 and 32. A first one 30 of the pair of A-frame assemblies attaches to the toolbar 18. The second one 32 of the pair of A-frame assemblies attaches to the connector bar 26. A cross member 34 pivotally connects at distal ends 36, 38 to the apex 40, 42 of the pair of A-frames 30, 32, respectively. A colter disc assembly 44 connects to the connector bar 26 and extends downwardly towards the ground of the field. A colter disc 48 connects at a distal end of the assembly 44, for cutting vines between the rows of the root-crop as the tractor moves the DSI apparatus through the field, so that each row of vines is distinct for harvesting by the DSI.

Figure 2:
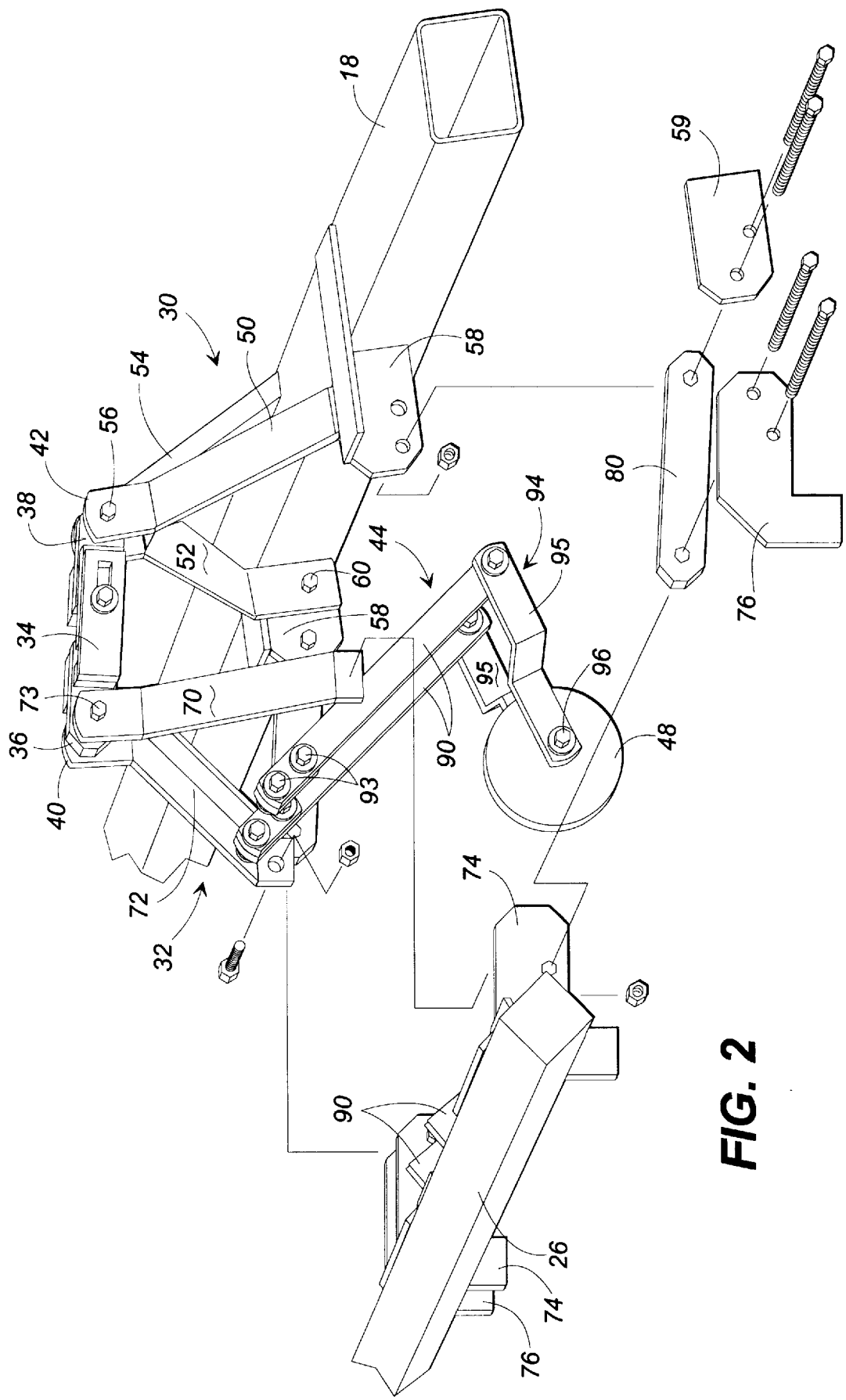
FIG. 2 is a detailed perspective exploded view of the linkage illustrated in FIG. 1 between the tractor and the digger/shaker/inverter apparatus.

FIG. 2 is a detailed perspective exploded view of the linkage connecting the toolbar 18 to the connector bar 26 of the DSI 12 illustrated in FIG. 1. The A-frame 30 comprises a pair of arms 50, 52 formed to define a substantially A-shape when disposed in facing mirror relation. The aligned ends of the arms 50, 52 define the apex 42 of the A-frame 30. A forward support 54 extends between the toolbar 18 and the apex 42. A bolt 56 extends through holes in the upper ends of the arms 50, 52 and through the distal end 38 of the cross member 34. A pair of spaced apart flanges 58 attach to the toolbar 18 and extend rearwardly from the toolbar. A lower end of the arms 50, 52 attach rigidly to the flanges 58 with bolts 60.

The second A-frame 32 similarly comprises angled arms 70, 72 which are disposed in facing mirrored relation to define an A-shape. Holes in the arms 70, 72 at the apex 42 end of the frame 30 receives a bolt 73 that connects the A-frame 32 to the distal end 36 of the cross-arm 34. Two pairs of flanges 74, 76 are spaced-apart and attach to and extend forwardly of the connector bar 26. The lower ends of the arms 70, 72 rigidly connect to one of the respective pairs of flanges 74, 76. A support bar 80 pivotally connects to the pair of flanges 74, 76 at a first end and at a second end to the flanges 58, 59 on the tool bar 18.

A pair of flanges 90 extend forward from the connector bar 26. The flanges 90 are preferably medial the pairs of flanges 74, 76. The wheel assembly 44 connects to the flanges 90. The wheel assembly 44 comprises a pair of parallel members 92 which attach with bolts 93 to the flange members 90. A yolk 94 comprising two members 95 attaches at distal ends of the members 92. The wheel 48 rotatably connects with a bolt 96 to a distal end of the yolk 94. A spring member (not illustrated) connects between the members 92 and 95 to bias the colter disc 48 towards the ground.

Figure 3:
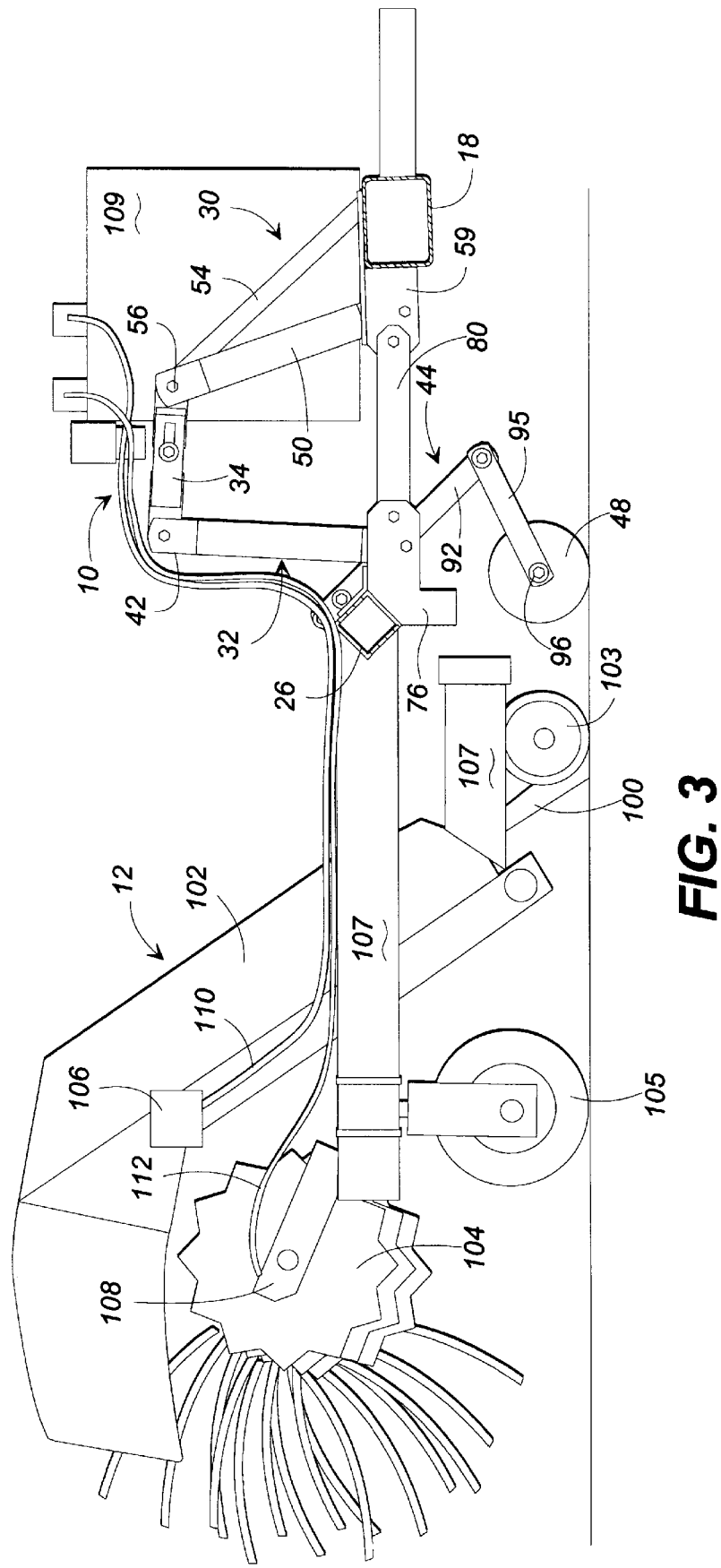
FIG. 3 is a side elevational view of the linkage illustrated in FIG. 1 attached to a digger/shaker/inverter apparatus.

FIG. 3 illustrates a side elevational view of the linkage 10 attached to the digger/shaker/inverter apparatus 12, which is conventional, except for hydraulic motors for operating the shaker and the inverter components. U.S. Pat. No. 3,726,345 illustrates a conventional DSI which has drive shafts and pulley means driven by connection to the power-takeoff of the tractor. The DSI 12 includes a conventional digger 100 for digging a root-crop from a field. A conventional shaker 102 receives the vines and operates to shake dirt from the roots of the vine. A conventional inverter 104 turns the vines over in order to expose the root-crop to the atmosphere. A trailing end of the inverter 104 lays the exposed vines on the ground as the tractor moves through the field. A pair of front wheels 103 and a pair of rear wheels 105 attach to frame members 107 on opposing sides of the digger/shaker/inverter. The vertical distance between the wheels 103, 105 and the frame members 107 are adjustable for selectively setting the digger/shaker/inverter relative to the ground. The wheels 103, 105 follow the undulations of the field as the DSI moves through the field pulled by the tractor. The DSI are conventional, except that the present invention provides hydraulically operated drive motors 106, 108 which connect to and operate the rotatable axles in the respective shaker 102 and inverter 104.

A hydraulic pump and oil reservoir 109 attaches to the toolbar 18. Hydraulic hoses 110, 112 connect between the hydraulic pump 109 and the hydraulic motors 106, 108. In a preferred embodiment, the hydraulic motors 106 of the shakers 102 connect in series whereby the shakers all operate at the same speed and the hydraulic motors 108 of the inverters 104 connect in series whereby the inverters all operate at the same speed. Conventional valves (not illustrated) control the flow the hydraulic oil to the motors 106, 108 for adjusting the speed of the shakers and the inverters.

The present invention operates to provide vertical movement of each DSI 12 in a multiple unit row-crop harvester independently of the other DSI units. With reference to FIG. 1, three DSI units connect to the three connector bars 26. The connector bars 26 connect through the respective linkages 10 to the toolbar 18 which is conventionally attached to a tractor 16. The tractor 16 moves through the field pulling the multi-unit DSI. Each DSI harvests two adjacent rows of root-crops. The wheels 103, 105 track the elevation of the field between the adjacent rows of root-crop independently for each DSI. Each connector bar 26 is independent of the adjacent connector bar. Accordingly, should the elevation of the ground over which the first DSI travels decrease, the wheels 103, 105 track the change in elevation downward. The support arms 80 pivot downwardly about the connections to the connector arm 26 and the toolbar 18. Likewise, the pivotally connected cross member 34 allows the second A-frame 32 to move downwardly in response to the tracking of the ground elevation by the wheels 103, 105. The DSI moves vertically independently to the other DSI pulled by the tractor.

Similarly, should the elevation of the ground over which the DSI travels rise, the wheels 103, 105 track the change in elevation upwardly. The support arms 80 pivot upwardly about the connections to the connector arm 26 and the toolbar 18. The pivotally connected cross member 34 allows the second A-frame 32 to move upwardly in response to the tracking of the ground elevation by the wheels 103, 105. The DSI moves vertically independently of the other DSI pulled by the tractor. It is appreciated that bushings (not illustrated) in the pivot connections, such as in the apex 40, 42, and the connections between the support arms 80 and the connector arm 25 and the tool bar 26, allow the DSI some wobble or flexibility about a vertical plane perpendicular to the direction of travel of the tractor through the field. The DSI may thereby also slightly "rock" side-to-side, as well as move vertically, in response to the wheels 103, 105 moving over the uneven surface of the field.

The hydraulic pump and reservoir 109 communicates hydraulic fluid under pressure to the hydraulic motors 106, 108 in order to drive the rotatable portions of the shaker 102 and inverters 104 of the DSI 12. The motors 106 operate the shaker 102 in each DSI 12 at the same speed so that the vines are pulled by the shaker and shake the same speed uniformly as the tractor moves the DSIs 12 through the field. The motors 108 operate the inverter 104 in each DSI 12 at the same speed so that the vines are moved and inverted by the inverter at the same speed uniformly as the tractor moves the DSIs 12 through the field. The linkages 10 provide independent vertical movement of each DSI as the tractor moves the DSIs through the field. The linkage of the present invention permits use of multi-unit DSI that reduce the cost and time of harvesting root-crops while maintaining efficient harvest of the root-crops.

The principles, preferred embodiments, and modes of operation of the present invention have been described in the forgoing specification. The invention is not to be construed as limited to the particular form disclosed, because this is regarded as illustrative rather than restrictive. Moreover, variations and changes may be made by those skilled in the art without departure from the spirit of the invention as described by the following claims.

What is claimed is:

1. A multi-row root-crop harvester attachable to a tractor, which harvester has linkage for independent vertical movement of at least two digger/shaker/inverter assemblies for digging root-crop vines from the ground in a field, shaking dirt from the vine roots, and inverting the root-crop vines for exposing the peanuts to air, comprising:
   an elongated first tool bar for attachment to a tractor for pulling at least a pair of digger/shaker/inverter assemblies through a root-crop field to be harvested;
   at least two elongated second tool bars, each attached to a separate respective one of the digger/shaker/inverter assemblies; and
   at least a pair of linkages, each connected between the first tool bar and a respective one of the second tool bars;
   each linkage comprising:
      a pair of A-frame assemblies, a first one of the pair attached to the first tool bar and a second one of the pair attached to one of the second tool bars; and
      a cross-member pivotally connected at distal ends to the pair of A-frames,
   whereby the digger/shaker/inverter assemblies, being attached to separate second tool bars connected by the linkages to the tool bar on a tractor, move vertically independently of the other such digger/shaker/inverter assembly as the tractor pulls the digger/shaker/inverter assemblies through the root-crop field to be harvested.

2. The multi-row root-crop harvester as recited in claim 1, further comprising a pair of support members pivotally connected between the first tool bar and the respective one of the second tool bars.

3. The multi-row root-crop harvester as recited in claim 1, further comprising a colter disc assembly attached to the respective second tool bar and depending therefrom for cutting vines in the field.

4. The multi-row root-crop harvester as recited in claim 1, further comprising means for operating the digger/shaker/invertor assemblies independently.

5. The multi-row root-crop harvester as recited in claim 4, wherein means for operating comprises a plurality of hydraulic motors connected to the digger/shaker/invertor assemblies and each digger/shaker/invertor assembly driven by a central hydraulic pump communicating through a plurality of hoses to the hydraulic motors.

6. The multi-row root-crop harvester as recited in claim 5, wherein the hydraulic motors for operating the shakers in the digger/shaker/invertor assemblies are connected in series for operating the shakers at a uniform speed.

7. The multi-row root-crop harvester as recited in claim 5, wherein the hydraulic motors for operating the inverters in the digger/shaker/invertor assemblies are connected in series for operating the inverters at a uniform speed.

8. A multi-row peanut harvester having linkage for independent vertical movement of digger/shaker/inverter assemblies for digging peanut vines from the ground in a field, shaking dirt from the peanut vine roots, and inverting the peanut vines for exposing the peanuts to air, comprising:
   an elongated first tool bar for attachment to a tractor for pulling at least two peanut harvesters comprising digger/shaker/inverter assemblies through a field of peanut vines to be harvested;
   an elongated second tool bar attached to each of the peanut harvesters;
   a linkage connected between the first tool bar and each of the second tool bars; and
   each linkage comprising:
      a first A-frame assembly attached to the first tool bar;
      a second A-frame assembly attached to the respective one of the second tool bars; and
      a cross-member pivotally connected at distal ends to the pair of A-frames;
   each of the peanut harvesters attached to a separate one of the second tool bars; and
   motor means for driving the digger/shaker/inverter assemblies of each of the pair of peanut harvesters independently,
   whereby the peanut harvesters, being attached to separate second tool bars connected by the linkages to the first tool bar on the tractor, move vertically independently of the other such peanut harvesters to follow changes in the elevation of the ground over which the peanut harvester is passing as the tractor pulls the peanut harvesters through the field of peanuts to be harvested.

9. The multi-row peanut harvester as recited in claim 8, wherein the linkage comprises a pair of support members pivotally connected between the first tool bar and the respective one of the second tool bars.

10. The multi-row root-crop harvester as recited in claim 8, further comprising means for operating the digger/shaker/invertor assemblies independently.

11. The multi-row root-crop harvester as recited in claim 10, wherein means for operating comprises a plurality of hydraulic motors connected to the digger/shaker/invertor assemblies and each digger/shaker/invertor assembly driven by a central hydraulic pump communicating through a plurality of hoses to the hydraulic motors.

12. The multi-row root-crop harvester as recited in claim 11, wherein the hydraulic motors for operating the shakers in the digger/shaker/invertor assemblies are connected in series for operating the shakers at a uniform speed.

13. The multi-row root-crop harvester as recited in claim 11, wherein the hydraulic motors for operating the inverters in the digger/shaker/invertor assemblies are connected in series for operating the inverters at a uniform speed.

14. The multi-row root-crop harvester as recited in claim 8, further comprising a colter disc assembly attached to each of the respective second tool bar and depending therefrom for cutting vines in the field.

* * * * *